UNITED STATES PATENT OFFICE.

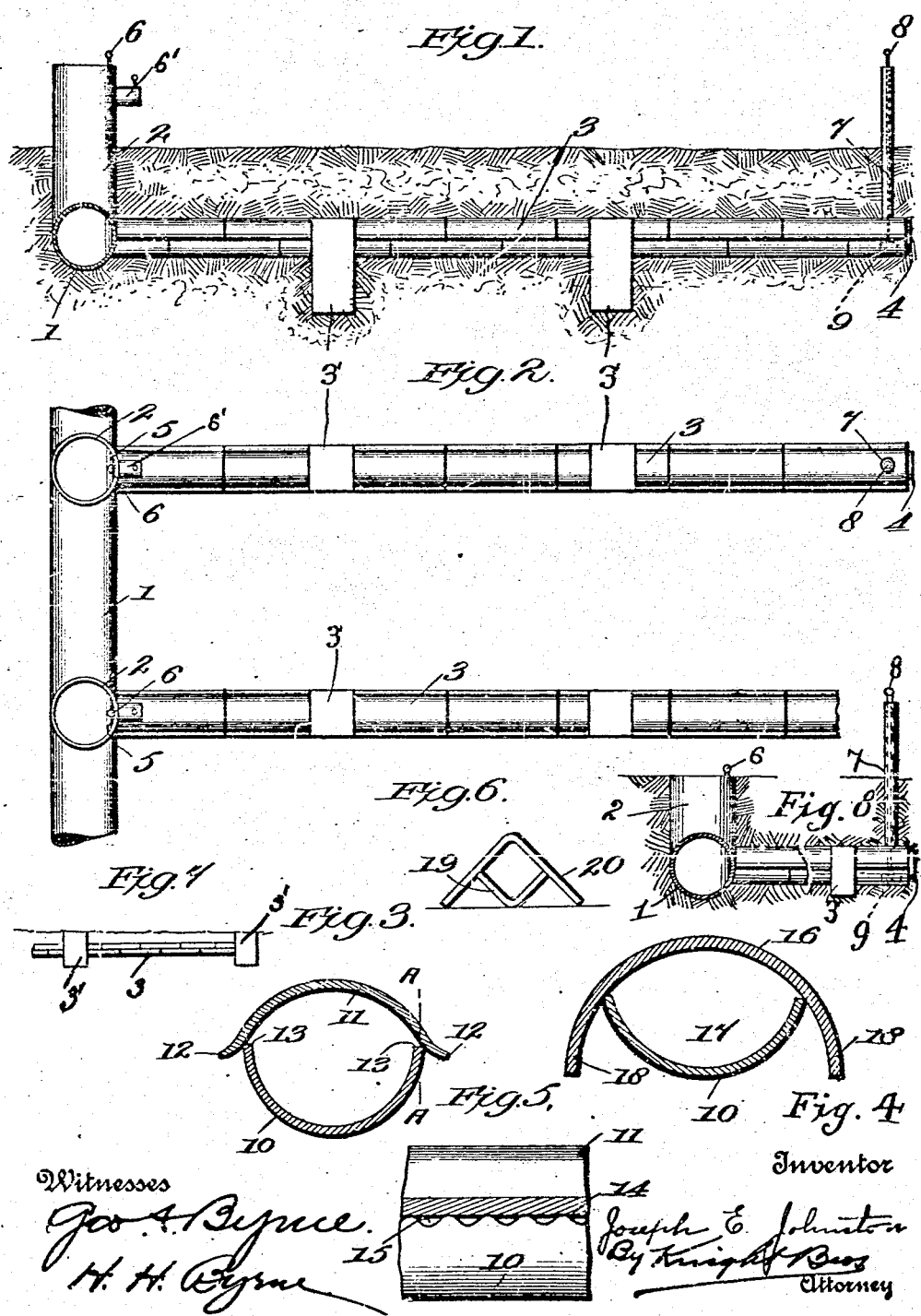

JOSEPH E. JOHNSTON, OF POMONA, CALIFORNIA.

SYSTEM OF IRRIGATION.

988,639.

Specification of Letters Patent. Patented Apr. 4, 1911.

Application filed June 19, 1909. Serial No. 503,215.

*To all whom it may concern:*

Be it known that I, JOSEPH E. JOHNSTON, a citizen of the United States, residing at Pomona, in the county of Los Angeles and State of California, have invented certain new and useful Improvements in Systems of Irrigation, of which the following is a specification.

My present invention relates to systems of irrigation, and has for its purpose to provide an improved means for reclaiming arid lands wherein the water heretofore wasted is distributed effectively throughout the district to be reclaimed.

The further purpose of the invention is to adapt the same system for use in draining marsh lands wherein the accumulation of sediment within the conduits is practically eliminated, and whereby such sediment as may accumulate can be readily removed.

The conduit employed in my system is formed from a plurality of horizontal sections which by their peculiar manner of assembling render the pipe capable of discharging water under ground throughout its entire length for irrigating, and also capable of receiving water when the system is used for drainage purposes. The peculiar structure and manner of assembling the pipe sections are of further advantage in that said pipes are capable of being frozen without injury, and the joint of the sections is such as will prevent any excessive packing of earth thereon and also minimize the interference of the roots of plants or trees therewith.

With the above as the essential advantages, my system and improved form of conduit embody other improvements which will be evident from the course of the following extended description and set forth in the claim.

In the accompanying drawing which shows the invention in its preferred structure, Figure 1 is a view partly in section and elevation of the system, Fig. 2 is a top plan view of part of the water main, and two of the laterals, Fig. 3 is a transverse sectional view of the lateral 3, Fig. 4 is a similar view of a modified form of pipe, Fig. 5 is a detail section taken along the line A—A of Fig. 3, showing a modified edge for lower section. Fig. 6 is a further modification of conduit. Fig. 7 illustrates another slightly modified structure, and Fig. 8 illustrates a further modification.

Referring to the several figures wherein like reference characters indicate corresponding parts in the different views shown, the system comprises a water main 1 leading from the reservoir or other source of supply to the territory to be irrigated. At suitable distances throughout the length of the main 1 are disposed a number of stand pipes 2 that are vertically set and have their upper ends projecting beyond the surface of the ground and provided with valved controlled outlets 6', the reason wherefore being that by means of the stand pipes the land may be flooded by permitting water to flow therefrom. In certain instances it may be advisable to have the stand pipes 2 meeting flush with the earth; this may be done without in any manner affecting the operation of the system. At the points of juncture of the stand pipes with the water main are disposed the laterals or water distributers, or collectors, which are designated by the numeral 3 and which comprise in their make up a plurality of sections, which sections are connected in such a manner that water may be distributed or collected throughout their entire length. Each of the lateral distributers 3 has its end section terminated by meeting abruptly against the block or plate 4. This closure plate 4 serves to prevent entrance into the lateral of burrowing animals.

Communication between pipes 3 and the main 1 is controlled by a gate valve 5 operated through the medium of a rod 6, which gate and rod may be of any preferred type. At the terminating end of each of the laterals 3 there is a vertical pipe 7 of relatively small diameter whose function is to receive the rod 8 of the float signal 9, which float is suspended within the body of the pipe 3. The purpose of this device is, as will be obvious, to enable the operator to determine by a visible sign the exact water level within the pipe 3; and the pipes 7 are further useful in that they serve as a duct or pass for such air as would accumulate within the laterals 3 and thus permit ready flow of the water thereinto upon the opening of the gate valve 5.

Referring to the details of structure of the laterals or water distributing branches 3 the same comprise a plurality of lower and upper section members designated 10 and 11 respectively, which lower sections are substantially semicircular in cross section, or a lateral half of an ordinary pipe. These sections may be made of metal, terra cotta, cement or any similar material, but preferably of that kind having percolating qualities. The upper sections 11 are on the other hand of considerably greater dimension across their side edges and of less height than the corresponding dimensions of the lower section, and are adapted to be superposed upon the side edges of the lower section in the manner shown in Fig. 3. The lateral edges of the superposed parts 11 are peculiarly constructed as indicated at 12 in Fig. 3, which edges depend below the line of union between the upper and lower sections and constitute protecting ledges that prevent too great packing of soil on these union lines which are, as will be presently described, the means for effecting communication between the interior and exterior of the laterals 3.

The side edges of the lower sections 10 may be perfectly straight so that when the upper sections 11 are superposed thereon in the manner shown in Fig. 3 there is provided a line of contact 13 between the members which has no substantial width so that water may percolate therethrough in either direction dependent, of course, upon the use of the system, i. e., whether for irrigating or drainage. Instead of having the side edges of the lower sections with straight edges as employed in Fig. 3 they may be sutured or rough as indicated at 14 in Fig. 5 in which event there is provided a plurality of openings 15 through which water may readily pass.

In assembling the several sections in pipe construction the lower sections are first laid in the bottom of the ditch dug for the purpose, and placed upon them in the manner shown in Fig. 3 and in alternate relation are the covering sections 11, i. e., the end joints of the bottom sections occur intermediate the end joints of the upper sections by which manner the center of each upper section is immediately over a joint of the lower sections and vice versa. This idea of separating the pipe into a lower or base and a covering section is of further advantage in that should it be desired to clean the pipe of sediment or other accumulation that would collect in its trough, it would be necessary only to remove the covering section whence this cleaning could be effected without disturbing the lower section from its bed.

At suitable distances throughout the length of the laterals are arranged sediment receiving boxes 3' which when in position stand below the level of the lateral bed, whereby the water discharges into them and after filling continues through the remaining lengths of the distributing lateral. In the arrangement shown in Fig. 7 one of these sediment boxes which in addition to its regular function serves also as the plug or closure for the pipe in place of the block 4 shown in Fig. 1. It will therefore be readily seen that in using this particular type of distributer such sediment as is carried by the water will be readily collected at these points and thus may be readily removed.

The type of lateral thus far described is particularly appropriate for reclaiming such ground as would be used for ordinary crops in which event the ledges 12 of the upper section provide a means for deflecting the roots of plants that would otherwise grow against and close the water outlet passage; but where the system is to be used for irrigating land for orchard culture there is designed a special form of distributing lateral as shown in Fig. 4. In this event the lower sections constituting the base of the pipe are precisely the same as above described, but for the covering sections there are employed section 16 corresponding exactly to the sections 10 but of such diameter as will allow of their being superposed upon the lower sections and provide between them the water channel 17. In this case the side edges of the sections 16 lie within a plane passing through the lowest point of the section 10. The dependent portions 18 of the top sections serve in this instance in the same capacity as the ledges 12 of the other type of lateral. In the present instance the members 18 constituting the guards are deemed sufficient to withstand any tendency of the roots of trees toward interfering with the water passages. In the type shown in Fig. 6, the lower section 19 and the upper section 20 comprise each a substantially right angle part whose relative proportion and manner of assembling are in every respect similar to the corresponding parts shown in Fig. 4.

From the foregoing description it will be seen that the lateral herein employed is particularly suitable for the purpose of irrigation or drainage since by reason of the peculiar manner of assembling the several sections constituting the pipe the same is virtually a flexible conduit, thus permitting the same to withstand all changes in the temperature of the earth, and to be frozen without danger of bursting, and there is the further advantage that by reason of the peculiar design of the several parts it is well adapted to be readily transported.

While I have shown and described the present invention in its details of structure, I do not wish it understood that I have limited myself to the precise details shown but rather reserve instead the right to make such changes therein as will better adapt the invention to its purpose.

What I claim as new, is:—

In a system of irrigating or drainage, the combination with a main, of overflow stand pipes therefor, a plurality of lateral distributing pipes leading from the main, said laterals comprising loosely assembled upper and lower pipe sections to permit of expansion and the distribution or collection of water throughout the length of the laterals, sediment receiving boxes located in said laterals, float valves for indicating the level of water within the laterals, and means for controlling the flow of water between said laterals and the main.

The foregoing specification signed at Pomona, Cal. this 26th day of April, 1909.

JOSEPH E. JOHNSTON.

In presence of—
J. LEADINGHAM,
WALTER A. LEWIS.